F. DESSAUER.
NUT LOCK.
APPLICATION FILED MAR. 23, 1918.
1,300,132.
Patented Apr. 8, 1919.
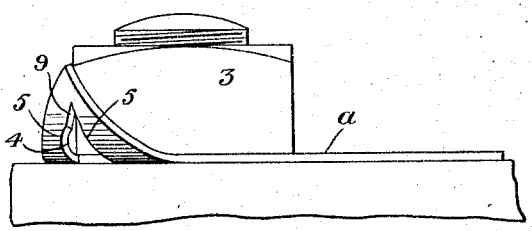
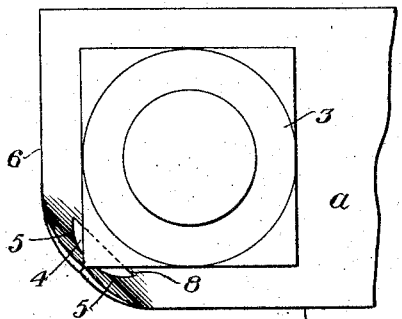
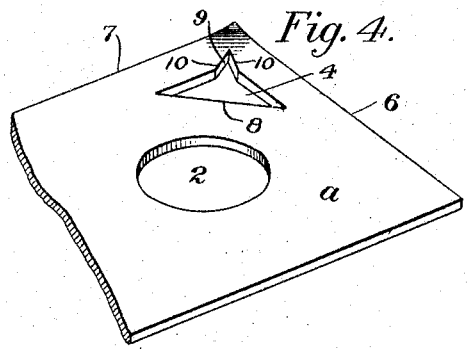
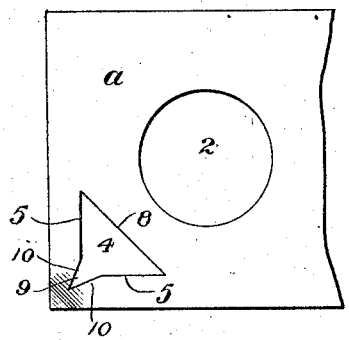
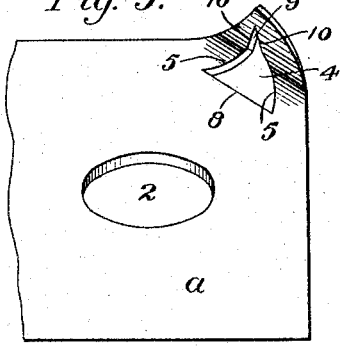
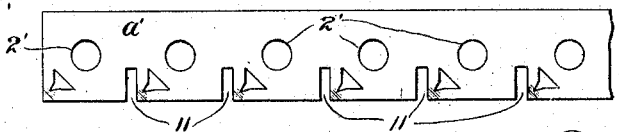
WITNESSES
INVENTOR

UNITED STATES PATENT OFFICE.

FREDERICK DESSAUER, OF PITTSBURGH, PENNSYLVANIA.

NUT-LOCK.

1,300,132.

Specification of Letters Patent.

Patented Apr. 8, 1919.

Application filed March 23, 1918. Serial No. 224,342.

*To all whom it may concern:*

Be it known that I, FREDERICK DESSAUER, a citizen of the United States, residing at Pittsburgh, in the county of Allegheny and State of Pennsylvania, have invented certain new and useful Improvements in Nut-Locks, of which the following is a specification.

My invention consists in an improvement in nut locks of the class of washer locks, and has for its object to provide a cheap, simple and efficient means for holding the nut of a bolt by corner engagement with an upturned portion of the device.

Generally stated, the invention comprises an integral piece of sheet or plate metal preferably made of a low carbon steel, capable of being easily bent, having a perforating bolt hole and a bearing portion for the nut, the washer plate being generally rectangular, and having one of its corner portions cut out in the manner hereinafter described, and adapted to be bent up into holding engagement with the corner of a nut, either square or hexagon.

Referring to the drawings which illustrate one preferred embodiment of the invention, Figure 1 is a view in side elevation showing the nut lock as applied to a nut;

Fig. 2 is a plan view of Fig. 1;

Fig. 3 is a plan view of the nut locking washer detached;

Fig. 4 is a similar view in perspective;

Fig. 5 is a view in perspective partly broken away showing the corner of the plate bent up into holding position;

Fig. 6 is a plan view showing a composite locking strip provided with a plurality of bolt holes and corresponding holding corner portions.

The nut locking washer, which is generally indicated by the latter *a*, comprises a preferably rectangular piece of plate or sheet metal adapted to be laid flatwise upon the surface of any article with which the bolt and nut are used, and provided at any desired portion of the plate with a perforated bolt hole 2.

One or more corner portions of the plate *a*, sufficiently adjacent to the bolt hole 2 to operatively engage the corner of the nut 3, when bent up, is provided with a generally triangularly shaped aperture 4 cut out of the metal. Said aperture is bounded within the inner edges 5, 5, arranged generally at right angles to each other and substantially parallel to the end edge 6 and side edge 7 of the washer plate, and the inner diagonally arranged edge 8. The outer converging corner of the triangle thus formed is enlarged by a more acute pointed opening 9, defined within converging edges 10, 10, disposed toward the corner of the plate, and providing by their arrangement with the main aperture, a narrow converging angular acute opening.

In applying the nut lock to use, it is located over the bolt, the nut is screwed up tight with its corner located in operative relation to the corner opening of the plate, which portion is then bent upwardly by any suitable tool, as a cold chisel or swage, as indicated in Fig. 5.

When set up tightly against the nut, as indicated in Figs. 1 and 2, the edges 5, 5, of the opening 4 will be brought into approximately close contact with the adjacent faces of the nut 3, whether the nut is square or hexagon. The more acute terminal opening 9 and its edges 10 are bent directly into close, tight, binding engagement with the upper edge portion of the nut, closely embracing and positively holding the nut against movement in either direction. If it is desired to unscrew the nut or further tighten it, the corner may be depressed away from engagement and again bent upwardly, when the nut is readjusted.

In Fig. 6 I have shown the same general arrangement as to the operative elements of the device, but in a continuous strip form having a plurality of bolt holes 2', suitably located as to distance apart throughout the continuous strip *a'* and between each pair of adjacent holes the strip is partly separated by an edge opening 11. By this construction, I provide the corner element which is apertured in the same manner as above described, each corner being thus capable of independent adjustment in the manner set forth. Otherwise, the nut lock is substantially the same as the single form, and provides a continuous integral one piece lock adapted for application to a series of bolts in a row, as in the case of the bolts of an ordinary rail joint.

The advantage of the invention will be readily understood and appreciated by all those familiar with this class of holding devices, and is capable of being made at low cost with a comparatively small amount of waste material and of performing its intended functions in a highly effiecient man-_

The device may be changed and varied in relative proportions and sizes, or in other details, by the skilled mechanic, but all such changes are to be considered as within the scope of the following claims.

What I claim is:

1. A nut lock consisting of a washer plate having a bolt hole and a corner portion having a triangular opening providing converging nut-engaging edges adapted to be turned up to engage the corner of a nut.

2. A nut lock consisting of a washer plate having a bolt hole and a corner portion having a triangular opening providing converging nut-engaging edges at substantially right angles to each other and terminating in more acute angular inner terminal edges adapted to be turned up to engage the corner of a nut.

3. A nut locking washer plate having a plurality of bolt holes, partly severed at one edge portion between the bolt holes providing corner members, said corner members each having a substantially triangular opening and adapted to be bent up into holding engagement with the corner of a nut.

In testimony whereof I hereunto affix my signature.

FREDERICK DESSAUER.

Copies of this patent may be obtained for five cents each, by addressing the "Commissioner of Patents, Washington, D. C."